United States Patent [19]
Frey et al.

[11] 4,065,462
[45] Dec. 27, 1977

[54] IMINOISOINDOLINONE METAL COMPLEX

[75] Inventors: Christoph Frey, Aesch; Jost von der Crone, Riehen, both of Switzerland

[73] Assignee: Ciba-Geigy Corporation, Ardsley, N.Y.

[21] Appl. No.: 619,889

[22] Filed: Oct. 6, 1975

[30] Foreign Application Priority Data

Oct. 17, 1974 Switzerland .................. 13919/74

[51] Int. Cl.² .................................. C07D 209/44
[52] U.S. Cl. ................................ 260/299; 260/39 P; 260/42.21; 260/250 AH; 260/302 D; 260/39 P; 260/304 R; 260/305; 260/307 D; 260/325 R; 260/37 N; 260/39 R; 106/288 Q; 106/292; 106/301; 548/327; 548/306
[58] Field of Search .................. 260/299; 106/288 Q

[56] References Cited

U.S. PATENT DOCUMENTS

3,897,439  7/1975  Frey .................................. 260/299

FOREIGN PATENT DOCUMENTS

202,139  8/1966  U.S.S.R. .......................... 260/299

Primary Examiner—Donald G. Daus
Assistant Examiner—D. B. Springer
Attorney, Agent, or Firm—Vincent J. Cavalieri

[57] ABSTRACT

Iminoisoindolinone metal complexes of formula

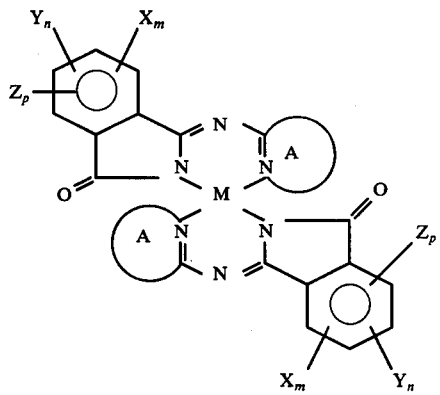

wherein A represents a 5- or 6-membered heterocyclic radical which contains at least one further heteroatom and can be fused or doubled with benzene nuclei, M represents a divalent metal atom excluding the alkaline earth metals, X represents a hydrogen atom, Y represents a halogen atom, Z represents a nitro group, an alkoxycarbonyl group of 2 to 6 carbon atoms or a group of formula $RY_2$—, wherein R represents a hydrogen atom, an alkyl group of 1 to 6 carbon atoms which is substituted by an aryl radical or is unsubstituted, a cycloalkyl group of 5 to 6 carbon atoms, or represents an aryl group, and $Y_2$ represents an oxygen or a sulphur atom, $m$ and $n$ are 0 to 4, $p$ is 0 to 2, and the sum of $m+n+p$ must be 4, which are useful for pigmenting high molecular organic material.

8 Claims, No Drawings

IMINOISOINDOLINONE METAL COMPLEX

Metal complexes which are obtained by metallisation of 3,3,4,5,6,7-hexachloroisoindolin-1-one condensed with 2-aminopyridine are described in Japanese published patent specification No. 73.29096. However, these complexes are unproductive and therefore not interesting as pigments.

The present invention provides useful new iminoisoindolinone metal complexes of formula

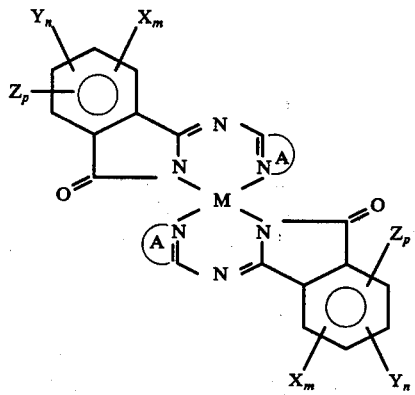
(I)

wherein A represents a 5- or 6-membered heterocyclic radical which contains at least one further heteroatom and can be fused or doubled with benzene nuclei, M represents a divalent metal atom excluding alkaline earth metals, X represents a hydrogen atom, Z represents a nitro group, an alkoxycarbonyl group of 2 to 6 carbon atoms or a group of formula $RY_2$—, wherein R represents a hydrogen atom, an alkyl group of 1 to 6 carbon atoms which is substituted by an aryl radical or is unsubstituted, a cycloalkyl group of 5 to 6 carbon atoms or an aryl group, and $Y_2$ represents an oxygen or a sulphur atom, $m$ and $n$ are 0 to 4, $p$ is 0 to 2, and the sum of $m+n+p$ must be 4.

Particularly interesting metal complexes are those of formula

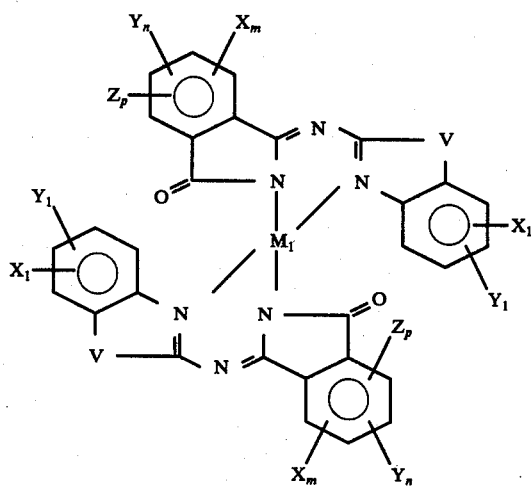
(II)

wherein X, Y, Z, $m$, $n$ and $p$ are as defined above, $M_1$ represents cobalt, copper or nickel, V represents an oxygen or a sulphur atom or especially an amino group, $X_1$ and $Y_1$ represent hydrogen or halogen atoms, alkyl, alkoxy, alkoxycarbonyl, alkylsulphonyl or alkylcarbamoyl groups, each containing 1 to 6 carbon atoms, nitro, carbamoyl or arylcarbamoyl groups, or the radicals $X_1$ and $Y_1$ form a fused benzene ring, and, in particular, those of formula II, wherein V represents an imino group.

The new metal complexes are obtained by treating iminoisoindolinones of formula

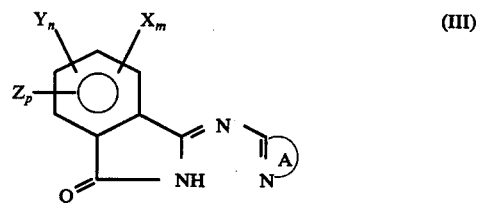
(III)

with agents which donate polyvalent alkali metals, excluding alkaline earth metals.

Particularly interesting starting materials are iminoisoindolinones of formula

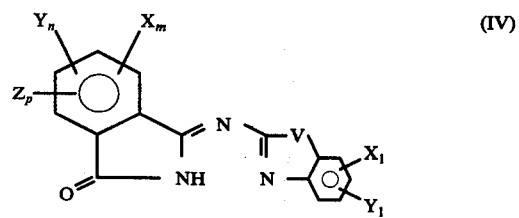
(IV)

wherein X, Y, Z, $m$, $n$ and $p$ are as defined above, $X_1$ and $Y_1$ are hydrogen or halogen atoms, alkyl, alkoxy, alkoxycarbonyl, alkylsulphonyl or alkylcarbamoyl groups containing 1 to 6 carbon atoms, nitro, carbamoyl or arylcarbamoyl groups, or the radicals $X_1$ and $Y_1$ form a fused benzene ring.

The iminoisoindolinones of formulae III and IV are in part known compounds. They are obtained by known methods by condensing an isoindolinone of formula

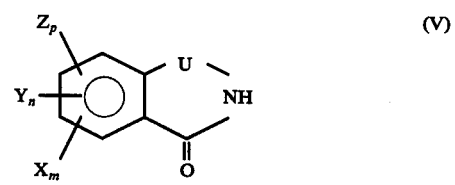
(V)

with an amine of formula

(VI)

wherein A, X, Y, Z, $m$, $n$ and $p$ are as defined hereinbefore and U represents a group of formula

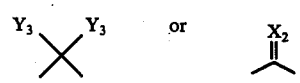

wherein $X_2$ represents an amino or a thio group and $Y_3$ represents a halogen atom, an alkoxy group of 1 to 4 carbon atoms or a secondary amino group.

Preferred isoindolinones are those of formula

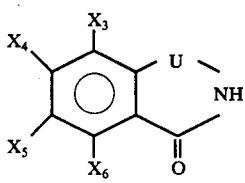

wherein U has the meaning already assigned to it, $X_3$ represents a hydrogen or halogen atom, an alkoxy or alkylmercapto group containing 1 to 6 carbon atoms, an aralkoxy group with an alkyl moiety containing 1 to 4 carbon atoms or represents an aryloxy group, $X_4$ represents a hydrogen or a halogen atom, a nitro, carboxy or carbamoyl group, an alkylcarbamoyl or alkanoylamino group containing 2 to 6 carbon atoms, or represents an arylcarbamoyl group, $X_5$ represents a hydrogen or a halogen atom, an alkoxy or alkylmercapto group containing 1 to 6 carbon atoms, an aralkoxy group with an alkyl moiety containing 1 to 4 carbon atoms, or represents an aryloxy group, and $X_6$ represents a hydrogen or a halogen atom.

In formula (VII), the symbols $X_4$ and $X_6$ preferably represent hydrogen or chlorine atoms or alkoxy groups containing 1 to 4 carbon atoms.

The following isoindolinones may be cited as examples:
3-imino-isoindolinone
4,5,6,7-tetrachloro-3-imino-isoindolinone
5,6-dichloro-3-imino-isoindolinone
4,5,7-trichloro-6-methoxy-3-imino-isoindolinone
4,5,7-trichloro-6-ethoxy-3-imino-isoindolinone
5,7-dichloro-4,6-dimethoxy-3-imino-isoindolinone
5,7-dichloro-4,6-diphenoxy-3-imino-isoindolinone
4,5,7-trichloro-6-methylmercapto-3-imino-isoindolinone
4,5,7-trichloro-6-phenylmercapto-3-imino-isoindolinone
3-imino-4,5-benz-isoindolinone
5- or 6-methyl-3-imino-isoindolinone
5- or 6-phenyl-3-imino-isoindolinone
4- or 7-chloro-3-imino-isoindolinone
5- or 6-chloro-3-imino-isoindolinone
4- or 7-nitro-3-imino-isoindolinone
5- or 6-nitro-3-imino-isoindolinone
5- or 6-methoxy-3-imino-isoindolinone
5- or 6-ethoxy-3-imino-isoindolinone
5- or 6-phenoxy-3-imino-isoindolinone
5- or 6-methylmercapto-3-imino-isoindolinone
3,3-dimethoxy-4,5,6,7-tetrachloro-isoindolinone
3,3-dimethoxy-4,5,6,7-tetrabromo-isoindolinone
3,3,6-trimethoxy-4,5,7-trichloro-isoindolinone
3,3-dimethoxy-4,5,7-trichloro-6-butoxy-isoindolinone
3,3-dimethoxy-4,5,7-trichloro-6-phenoxy-isoindolinone
3,3-dimethoxy-4,5,7-trichloro-6-(p-chlorophenoxy)-isoindolinone
3,3-dimethoxy-4,5,7-trichloro-6-(p-methylphenoxy)-isoindolinone
3,3-dimethoxy-4,5,7-trichloro-6-methylmercapto-isoindolinone
3,3-dimethoxy-4,5,7-trichloro-6-ethylmercapto-isoindolinone
3,3,4,6-tetramethoxy-5,7-dichloro-isoindolinone
3,3-dimethoxy-5-chloro-isoindolinone
3,3-dimethoxy-6-iodo-isoindolinone
3,3-dimethoxy-7-chloro-isoindolinone
3,3-dimethoxy-7-fluoro-isoindolinone
3,3-dimethoxy-4,5-dichloro-isoindolinone
3,3-dimethoxy-4,6-dichloro-isoindolinone.

The above isoindolinones are condensed with amines of formula (VI), especially with those of formula

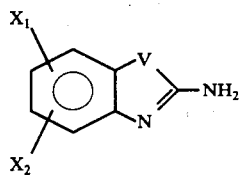

wherein V, $X_1$ and $X_2$ are as defined hereinbefore.

As examples there may be cited:
2-amino-thiazole
2-amino-benzthiazole
2-amino-benzoxazole
2-amino-4- or 6-chloro-benzthiazole
2-amino-4- or 6-bromo-benzthiazole
2-amino-5- or 6-methoxy-benzthiazole
2-amino-5- or 6-methyl-benzthiazole
2-amino-benzimidazole
2-amino-4-chloro-benzimidazole
2-amino-5-chloro-benzimidazole
2-amino-5,6-dichloro-benzimidazole
2-amino-4-chloro-6-methyl-benzimidazole
2-amino-5-methoxy-benzimidazole
2-amino-6-ethoxy-benzimidazole
2-amino-6-nitro-benzimidazole
2-amino-6-cyano-benzimidazole
2-amino-5-methylsulphonyl-benzimidazole
2-amino-N-methyl-benzimidazole
2-amino-N-oxethyl-benzimidazole
2-amino-N-phenyl-benzimidazole
2-amino-5-methyl-1,3,4-thiadiazole
2-amino-5-phenyl-1,3,4-thiadiazole
2-amino-pyridine-1,3,4-thiadiazole
2-amino-pyrazine-1,3,4-thiadiazole
as well as the bis-benzthiazolylamine of formula

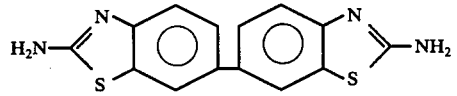

The cited amines are without exception known compounds.

The condensation of the isoindolinones with the amines of formula (VIII) already takes place partly at low temperature, if required with heating of the intimately mixed components, with particular advantage in the presence of inert organic solvents, i.e. solvents which do not participate in the reaction.

If the starting materials are 3-imino-, 3-thio-, or 3,3-bis-tert. amino-isoindolin-1-ones or alkali salts of 3,3-dialkoxyisoindolin-1-ones, then it is advantageous to use water-miscible organic solvents, e.g. lower aliphatic alcohols, such as lower alkanols, for example methanol, isopropanol or butanol, lower cyclic ethers, such as dioxan, ethylene glycol monomethyl ether, lower aliphatic ketones, such as acetone. In doing so, the condensation is able to take place even at relatively low temperatures. It is advantageous to perform the reaction in the presence of an alkali binding agent, for example a lower fatty acid which can be used simultaneously as solvent, especially acetic acid.

If the starting material is a 3,3-dihalogeno-isoindolin-1-one, it is preferred to use an organic solvent that does not contain hydroxy groups, for example an aromatic hydrocarbon, such as benzene, toluene, xylene, tetrahydronaphthalene or diphenyl; a cycloaliphatic hydrocarbon, for example cyclohexane; a halogenated aliphatic hydrocarbon, for example carbon tetrachloride or tetrachloroethylene, or a halogenated aromatic hydrocarbon, for example chlorobenzene or di- and trichlorobenzene; also a nitrohydrocarbon, for example nitrobenzene; an aliphatic ether, for example diphenyl ether, or a cyclic ether, for example dioxan; also a ketone, for example acetone; or an ester, for example an ester of a lower fatty acid with an alkanol, for example ethyl acetate, in the presence of an acid acceptor.

Since the resultant condensation products are sparingly soluble in the above cited solvents, it is possible to isolate them easily by filtration. Any remaining impurities can be removed by washing out.

The isoindolinones obtained are converted into the metal complexes by treatment with agents which donate alkali metals excluding alkaline earth metals, such as zinc or cadmium, but especially nickel, copper and cobalt. Preferably the formiates, acetates or stearates of these metals are used, for example nickel(II) acetate, copper(II) acetate, cobalt(II) acetate or cobalt(III) acetylacetonate. The metallising takes place advantageously in one or in a mixture of the above cited solvents or especially in dimethyl formamide, ethylene glycol monoalkyl ether or diethylene glycol monoalkylether.

It is also possible to carry out condensation and metallising together in the same reaction vessel. Instead of homogeneous salts, it is also possible to use mixtures of salts of different metals, in which case mixed metallised complexes are obtained.

On account of their favourable combination of excellent migration, light and weather fastness properties, the imidazole derivatives have a particularly interesting utility.

The new colourants constitute useful pigments which, in finely divided form, can be used for pigmenting organic material of high molecular weight, for example cellulose ethers and esters, such as ethyl cellulose, nitrocellulose, cellulose acetate, cellulose butyrate, natural resins or synthetic resins, such as polymerisation or condensation resins, for example aminoplasts, in particular urea/formaldehyde and melamine/formaldehyde resins, alkyd resins, phenolic plastics, polycarbonates, polyolefins, such as polystyrene, polyvinyl chloride, polyethylene, polypropylene, polyacrylonitrile, polyacrylic esters, rubber, casein, silicon and silicone resins, singly or in mixtures.

It is immaterial whether the cited materials of high molecular weight are in the form of plastics, melts or of spinning solutions, varnishes, paints or printing inks. Depending on the use to which they are put, it is advantageous to use the new pigments as toners or in the form of preparations.

To bring the pigments into a fine state of division it is often advantageous to subject them to a grinding process.

In the following Examples which illustrate the invention, the parts and percentages are by weight unless otherwise stated.

EXAMPLES 1 – 4

13.3 g of 2-amino-benzimidazole and 18.3 g of iminophthalimide chlorohydrate are refluxed, with stirring, in 150 g of ethylene glycol monoethyl ether for 4 hours. The precipitated product is then filtered off at room temperature, washed with methanol and water and dried in vacuo at 90°–100° C. It is a yellow crystalline powder of formula

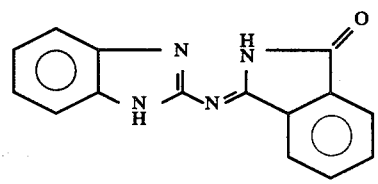

With stirring, 5.24 g of this product are heated in 100 parts of dimethyl formamide with 1.94 g of nickel acetate for 15 hours to 145°–150° C. The precipitate which has formed is filtered hot and washed with hot o-dichlorobenzene, cold methanol and water to yield a yellow crystalline powder which is finely divided by grinding it in isopropanol using grinding elements. When incorporated into polyvinyl chloride on a roll mill, it yields a yellow sheet with good fastness to migration and light. A varnish pigmented with it has very good fastness to light, weather and overstripe bleeding. By substituting equivalent amounts of the metal salts listed in column I of Table 1 for the nickel acetate, there are obtained pigments of the shades indicated in column II with similarly good properties.

Table 1

| Example | I | II |
|---|---|---|
| 2 | cobalt acetate . $4H_2O$ | reddish yellow |
| 3 | copper acetate . $H_2O$ | greenish yellow |
| 4 | zinc acetate . $2H_2O$ | yellow |

EXAMPLES 5 – 7

In accordance with Example 1, 15 g of 2-amino-benzthiazole are condensed with 18.3 g of iminophthalimide hydrochloride to yield a yellow compound of formula

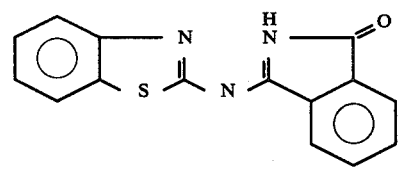

The metallisation is effected analogously to Example 1. Pigments are obtained which, when finely divided, impart to sheet polyvinyl chloride and varnishes pigmented therewith the shades listed in column II of Table 2.

Table 2

| Example | I | II |
|---|---|---|
| 5 | nickel acetate | yellow |
| 6 | cobalt acetate . $4H_2O$ | yellow |
| 7 | copper acetate . $H_2O$ | greenish yellow |

EXAMPLE 8

Table 3 lists further pigments with similar properties which are obtained by condensing the azole derivative of column I with the iminophthalimides of column II and metallising the resultant condensation product with the metal salts of column III. Column IV indicates the shade.

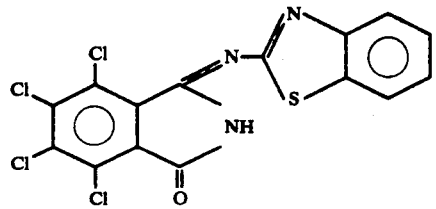

Table 3

| Ex. | Azole derivative | Iminophthalimide | Metal salt | Shade |
|---|---|---|---|---|
| 8 | [benzothiazole with CH₃O, NH₂] | [iminophthalimide NH·HCl] | nickel acetate | yellow |
| 9 | " | " | cobalt acetate | reddish yellow |
| 10 | " | " | copper acetate | yellow |
| 11 | [benzimidazole with C₂H₅O, NH₂] | [iminophthalimide NH·HCl] | cobalt acetate | reddish yellow |
| 12 | " | " | nickel acetate | yellow |
| 13 | " | " | copper acetate | greenish yellow |
| 14 | [benzimidazole with CH₃, CH₃, NH₂] | " | cobalt acetate | reddish yellow |
| 15 | " | " | nickel acetate | yellow |
| 16 | " | " | copper acetate | greenish yellow |
| 17 | [benzimidazole with CH₃O, NH₂] | " | cobalt acetate | reddish yellow |
| 18 | " | " | nickel acetate | yellow |

EXAMPLE 19

15.75 g of 3,4,5,6-tetrachloro-o-cyanobenzoic acid methyl ester are added to a solution of 100ml of methanol and 2.7 g of sodium methylate and the mixture is stirred for ½ an hour. Then 7.5 g of 2-aminobenzthiazole are added and the batch is stirred for 15 hours. The orange precipitate is then diluted with 100 ml of o-dichlorobenzene and acidified with 5 ml of acetic acid, whereupon the free yellow dye is formed. With stirring the temperature is increased to 150° C while distilling off methanol. After 2 hours the batch is allowed to cool to 60° C, the dye is filtered off with suction and washed with o-dichlorobenzene, methanol and water, and dried. Yield: 19 g of the dye of formula 4.17 g of this tetrachloroisoindolinone dye are heated in 100 ml of diethylene glycol monoethyl ether, with the addition of 1.25 g of cobalt acetate. 4H₂O, over the course of 6 hours to 150° C. The pigment which has formed is filtered off with suction and washed with cold methanol, acetone and water and dried, to yield 4.2 g of a yellowish brown pigment with a cobalt content of 7.02% (6.62% of theory for the 1:2 complex). Varnishes pigmented with this cobalt complex yield yellowish brown finishes with very good resistance to weathering.

EXAMPLES 20 – 49

Table 4 lists pigments which are obtained by the process of manufacture described in Example 19 under identical reaction conditions. The formulae of the isoindolinone dyes which are obtained as starting materials by the process described in Example 19, the metal atoms M and metal content of the complexes, as well as the colour of the pigmented varnishes, are also indicated.

Table 4

| Ex. | Isoindolinone Dye | M | Metal Content in % found | estimated | Shade of Varnish |
|---|---|---|---|---|---|
| 20 | [structure: tetrachloro isoindolinone with benzothiazole] | Ni | 5.3 | 6.83 | yellowish brown |
| 21 | " | Cu | 6.9 | 7.37 | yellowish brown |
| 22 | [structure: tetrachloro isoindolinone with benzimidazole] | Co | 6.9 | 6.88 | yellowish brown |
| 23 | " | Ni | 6.1 | 6.88 | medium yellow |
| 24 | " | Cu | 6.4 | 7.42 | yellowish brown |
| 25 | [structure: tetrachloro isoindolinone with methoxybenzothiazole] | Co | 6.6 | 6.2 | yellowish brown |
| 26 | " | Ni | 4.7 | 6.2 | yellowish brown |
| 27 | [structure: tetrachloro isoindolinone with chlorobenzoxazole] | Co | 6.9 | 6.36 | reddish yellow |
| 28 | [structure: trichloro methoxy isoindolinone with benzimidazole] | Co | 6.91 | 6.80 | yellowish brown |
| 29 | [structure: dichloro dimethoxy isoindolinone with benzimidazole] | Co | 6.91 | 7.03 | reddish yellow |
| 30 | " | Ni | 6.24 | 7.03 | medium yellow |
| 31 | [structure: dichloro diphenoxy isoindolinone with benzimidazole] | Co | 5.06 | 5.04 | reddish yellow |
| 32 | [structure: tetrachloro isoindolinone with oxadiazine] | Co | 7.6 | 7.55 | medium yellow |
| 33 | [structure: tetrachloro isoindolinone with dimethylbenzimidazole] | Co | | | reddish yellow |
| 34 | [structure: tetrachloro isoindolinone with methylbenzimidazole] | Co | | | reddish yellow |

Table 4-continued

| Ex. | Isoindolinone Dye | M | Metal Content in % found | estimated | Shade of Varnish |
|---|---|---|---|---|---|
| 35 | (tetrachloro isoindolinone)=N-(5-methylbenzimidazol-2-yl) | Ni | 6.36 | 6.63 | yellow |
| 36 | (tetrachloro isoindolinone)=N-(5-methyl-1,3,4-thiadiazol-2-yl) | Co | 6.6 | 7.18 | reddish yellow |
| 37 | (tetrachloro isoindolinone)=N-(5-phenyl-1,3,4-thiadiazol-2-yl) | Co | 6.2 | 6.24 | reddish yellow |
| 38 | (tetrachloro isoindolinone)=N-(5-chlorobenzimidazol-2-yl) | Co | | | yellowish brown |
| 39 | (tetrachloro isoindolinone)=N–C(S–N=C(phenyl))=N | Co | 6.26 | 6.24 | |
| 40 | (chloro isoindolinone)=N-(benzimidazol-2-yl) | Co | 8.97 | 9.06 | medium yellow |
| 41 | (dichloro isoindolinone)=N-(benzimidazol-2-yl) | Co | | | reddish yellow |
| 42 | (CH$_3$S, dichloro isoindolinone)=N-(benzimidazol-2-yl) | Co | 6.51 | 6.70 | medium yellow |
| 43 | (CH$_3$OOC isoindolinone)=N-(benzimidazol-2-yl) | Co | | | medium yellow |
| 44 | (tetrachloro isoindolinone)=N-(5-ethoxybenzimidazol-2-yl) | Co | 6.15 | 6.24 | reddish yellow |
| 45 | (CH$_3$O, trichloro isoindolinone)=N-(5-ethoxybenzimidazol-2-yl) | Co | 6.19 | 6.30 | reddish yellow |
| 46 | (tetrachloro isoindolinone)=N-(5-methoxybenzimidazol-2-yl) | Co | 6.44 | 6.43 | reddish yellow |

Table 4-continued

| Ex. | Isoindolinone Dye | M | Metal Content in % found | estimated | Shade of Varnish |
|---|---|---|---|---|---|
| 47 | [structure: tetrachloroisoindolinone with imidazoline-cyclohexyl-COOCH₃] | Co | 6.21 | 6.06 | yellow |
| 48 | [structure: tetrachloroisoindolinone with benzimidazole-C₂H₄OH] | Co | 6.02 | 6.13 | yellow |
| 49 | [structure: tetrachloroisoindolinone with benzimidazole-CH₃] | Co | 5.88 | 6.04 | yellow |

EXAMPLE 50

4.16 g of the bis-tetrachloroisoindolinone dye of formula

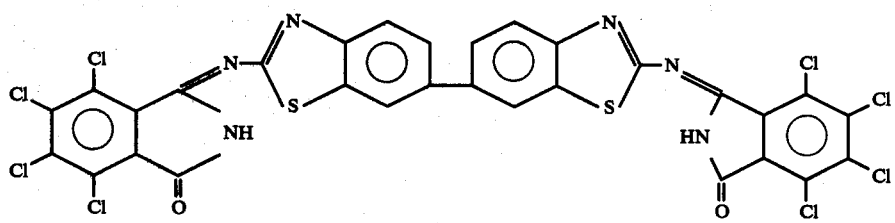

obtained by the general process of manufacture of Example 19 are heated in 50 of dimethyl formamide together with 1.37 g of cobalt acetate.4H₂O for 1 hour to 150° C. The working up of the pigment is effected as described in Example 19. Yield: 4.05 g of the 1:1 cobalt complex with a cobalt content of 6.65% (= 6.64% of theory). By bringing the pigment powder into a fine state of division it is possible to pigment varnishes therewith in strong, orange shades.

EXAMPLES 51 – 52

By using the bis-tetrachloroisoindolinones described in Table 5 as starting materials in Example 42, there are also obtained 1:1 complexes with the cobalt contents reported in Table 2.

Table 5

| Ex. | Bis-tetrachloroisoinsolinone | Cobalt found | Content estimated | Shade of Varnish |
|---|---|---|---|---|
| 51 | [structure: bis-tetrachloroisoindolinone linked via benzothiazole-O] | 6.52 | 6.57 | medium yellow |
| 52 | [structure: bis-tetrachloroisoindolinone linked via methyl-substituted bis-benzothiazole] | 5.8 | 7.1 | orange |

EXAMPLE 53

4 g of the non-metallised dye described in Example 22 are heated in 100 ml of ethylene glycol monoethyl ether together with 0.25 g of cobalt acetate.4H₂O and 0.88 g of zinc acetate.2H₂O for 2 hours to 120° C. The resultant pigment is filtered off with suction at 100° C and washed with cold methanol, acetone and water. It is then dried to yield 4.1 g of the 1:2 mixed complex whose metal content consists of 20% of cobalt and 80% of zinc. By bringing the pigment into a fine state of division and incorporating it into polyvinyl chloride in a roll mill, there is obtained a yellow sheet of outstanding fastness to migration and light.

EXAMPLE 54

5.24 g of the non-metallised dye of Example 1 are metallised under the reaction conditions of Example 51 with 1.25 g of cobalt acetate.4H$_2$O and 1.1 g of zinc acetate.2H$_2$O to yield the complex with a metal content of 50% of cobalt and 50% of zinc. When incorporated into polyvinyl chloride it yields a yellow sheet of good fastness to migration and light.

EXAMPLE 55

65 parts of stabilised polyvinyl chloride, 35 parts of dioctyl phthalate and 0.2 part of the pigment obtained according to Example 1 are stirred together and then rolled to and for 7 minutes at 140° C in a two roll mill. A brilliant yellow sheet of very good fastness to light and migration is obtained. The same result is obtained by substituting 0.2 part of the pigment of Example 2 for that of Example 1 and carrying out the above procedure.

EXAMPLE 56

10 g of titanium dioxide and 2 g of the pigment obtained in Example 1 are ground for 48 hours in a ball mill with 88 g of a mixture of 26.4 g of coconut alkyd resin, 24 g of melamine/formaldehyde resin (50% solids content), 8.8 g of ethylene glycol monomethyl ether and 28.8 g of xylene. The resultant varnish is sprayed onto an aluminium sheet, predried for 30 minutes at room temperature and then stoved for 30 minutes at 120° C. A brilliant yellow finish of good colour strength is obtained which is characterized by very good fastness to overstripe bleeding, light and weathering. The same result is obtained by using 2 g of the pigment of Example 2 instead of that of Example 1 and carrying out the above procedure.

EXAMPLE 57 (Acrylic Resin Stoving Enamel)

4 parts of the finely divided pigment of Example 1 are stirred into 20 parts of solvent of the following composition:
50 parts of Solvesso 150 (mixture of aromatic hydrocarbons)
15 parts of butyl acetate
5 parts of Exkin II (levelling agent based on ketoxime)
25 parts of methyl isobutyl ketone
5 parts of silicone oil (1% in Solvesso 150).

After complete dispersion has been attained (app. 15–60 minutes depending on the nature of the stirrer), the following binders are added: ;p0 48.3 parts of Baycryl L 530 (acrylic resin) (51% in xylene/butanol 3:1) and
23.7 parts of Maprenal TTX (melamine resin) (55% in butanol).
After it has been homogenised briefly, the varnish is applied by conventional methods, such as spraying or immersion or coil coating for the continuous coating of metal sheets, and stoved (stoving for 30 minutes at 130° C). The resultant yellow finishes are characterized by very good levelness, high gloss and excellent fine distribution of the pigment as well as by excellent weather fastness properties. The same result is obtained by using 4 parts of the pigment of Example 2 and carrying out the above procedure.

EXAMPLE 58

A non-delustred polyethylene terephthalate granulate suitable for fibre manufacture and 1% of the dye of Example 1 are shaken together in a sealable vessel for 15 minutes on a vibrator. The uniformly coloured granulate particles are spun to filaments in a melt spinning machine (285° C±3° C, retention time in the spinning machine app. 5 minutes). The filaments are stretched on a draw twister and wound onto a spool. Bright, yellow colourations are obtained which are characterised by outstanding light fastness, excellent fastness to washing, dry cleaning, cross dyeing and sublimation as well as by very good fastness to chlorite bleaching and very good fastness to rubbing after thermofixation of the coloured material.

EXAMPLE 59

In the same way as described in Example 58, a polypropylene granulate suitable for fibre manufacture is coloured with 1% of the dye of Example 22, extruded, and spun to give yellowish brown fibres of outstanding fastness properties.

We claim:
1. An iminoisoindolinone metal complex of the formula

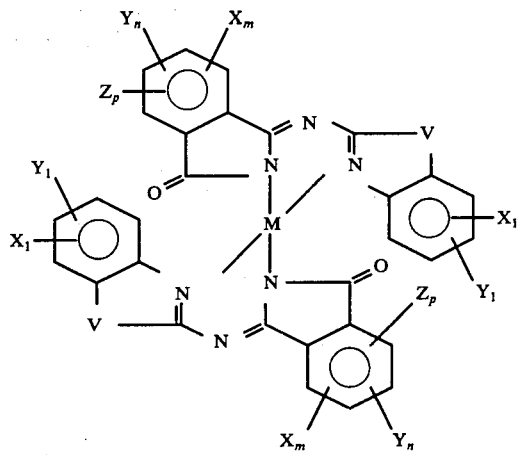

wherein M represents zinc, cadmium, cobalt, copper and nickel; X represents hydrogen; Y represents halogen; Z represents nitro, alkoxycarbonyl containing 2 to 6 carbon atoms, or a group of the formula RY$_2$—, wherein R represents hydrogen, alkyl of 1 to 6 carbon atoms, or cycloalkyl of 5 to 6 carbon atoms; Y$_2$ represents oxygen or sulphur; $m$ and $n$ are 0 to 4, $p$ is 0 to 2, and the sum of $m+n+p$ is equal to 4; X$_1$ and Y$_1$ represent hydrogen, halogen, alkyl, alkoxy, alkoxycarbonyl alkylsulphonyl, alkylcarbamoyl groups of 1 to 6 carbon atoms, nitro, carbamoyl, or the radicals X$_1$ and Y$_1$ form a fused benzene ring.

2. Metal complexes according to claim 1 of formula

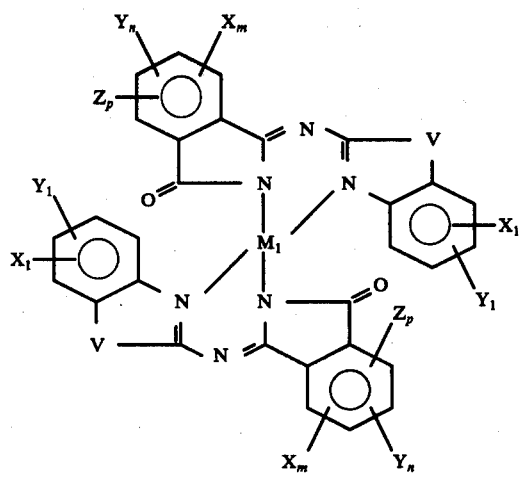

wherein X, Y, Z, m and p are as defined in claim 1, $M_1$ represents cobalt, copper or nickel, V represents an oxygen, sulphur or imino, $X_1$ and $Y_1$ represent hydrogen or halogen atoms, alkyl, alkoxy, alkoxycarbonyl, alkylsulphonyl or alkylcarbamoyl groups of 1 to 6 carbon atoms, nitro, carbamoyl, or the radicals $X_1$ and $Y_1$ form a fused benzene ring.

3. Metal complexes according to claim 2, wherein V represents an imino group.

4. A metal complex according to claim 2 of the formula

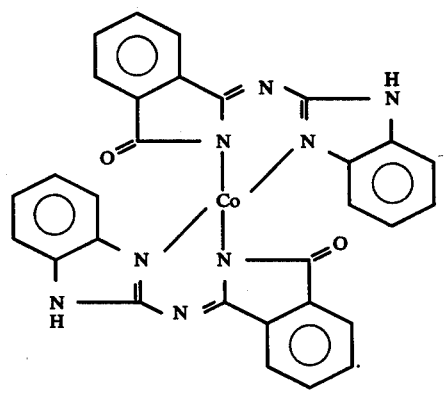

5. A metal complex according to claim 2 of the formula

6. A metal complex according to claim 2 of the formula

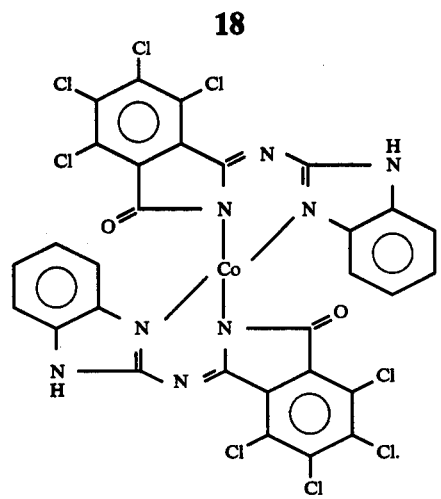

7. A metal complex according to claim 2 of the formula

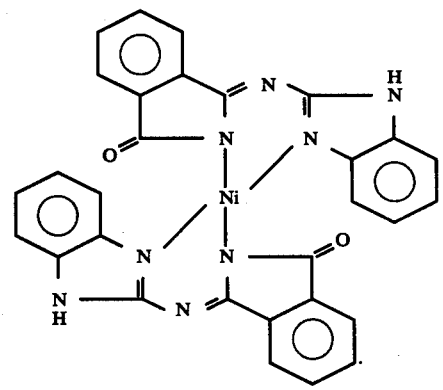

8. A metal complex according to claim 2 of the formula

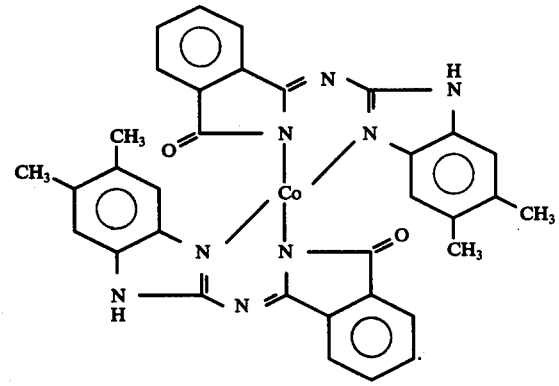

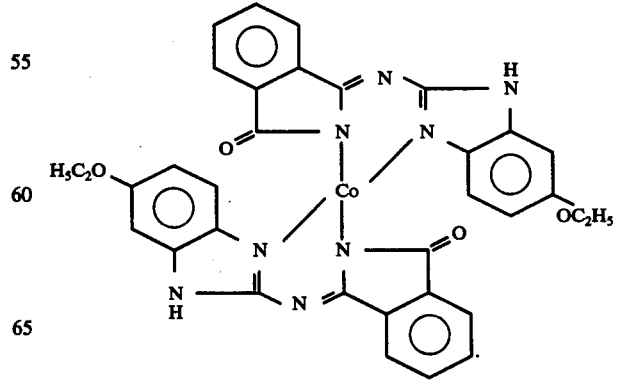

* * * * *